United States Patent [19]

Harley

[11] Patent Number: 5,284,401
[45] Date of Patent: Feb. 8, 1994

[54] FASTENING DEVICES

[75] Inventor: David N. Harley, Bournemouth, United Kingdom

[73] Assignee: Titus International Limited, Buckinghamshire, England

[21] Appl. No.: 860,495
[22] PCT Filed: Jul. 16, 1991
[86] PCT No.: PCT/GB91/01175
  § 371 Date: Jun. 17, 1992
  § 102(e) Date: Jun. 17, 1992
[87] PCT Pub. No.: WO92/02733
  PCT Pub. Date: Feb. 20, 1992

[30] Foreign Application Priority Data

Aug. 7, 1990 [GB] United Kingdom ............... 9017313

[51] Int. Cl.5 .............................................. F16B 12/00
[52] U.S. Cl. .................. 403/409.1; 403/407.1; 403/231
[58] Field of Search ............ 403/409.1, 407.1, 231, 403/7, 8, 188; 411/402, 407, 959, 185, 188, 187

[56] References Cited

U.S. PATENT DOCUMENTS

| 1,952,305 | 3/1934 | Beck | 411/959 |
| 2,112,494 | 3/1938 | Olson | 411/959 |
| 4,202,645 | 5/1980 | Giovannetti | |
| 4,599,011 | 7/1986 | Tashiro | 403/407.1 |
| 4,779,326 | 10/1988 | Ichikawa | 411/187 |
| 4,810,127 | 3/1989 | Hettich | |
| 4,820,235 | 4/1989 | Weber | 411/959 |

FOREIGN PATENT DOCUMENTS 3145825 11/1981 Fed. Rep. of Germany .
2074282 3/1981 United Kingdom .

Primary Examiner—Dave W. Arola
Assistant Examiner—Anthony Knight
Attorney, Agent, or Firm—Lowe, Price, LeBlanc & Becker

[57] ABSTRACT

A two-part fastening device for fastening two panels together is provided with a rotatable drum (16) with at least one camming surface and a pin (10) with a head (14) formed to engage with the camming surface. The pin (10) is secured in one panel to be fastened and the rotatable drum positioned in the other panel. The head (14) of the pin is passed into the drum member which is then rotated so that the camming surface acts to pull the head of the pin inwardly, thus drawing the two panels together. The head (14) of the pin is provided with protrusions (22) which cooperate with the rotatable drum so that locking engagement of the fastening device can be achieved.

12 Claims, 4 Drawing Sheets

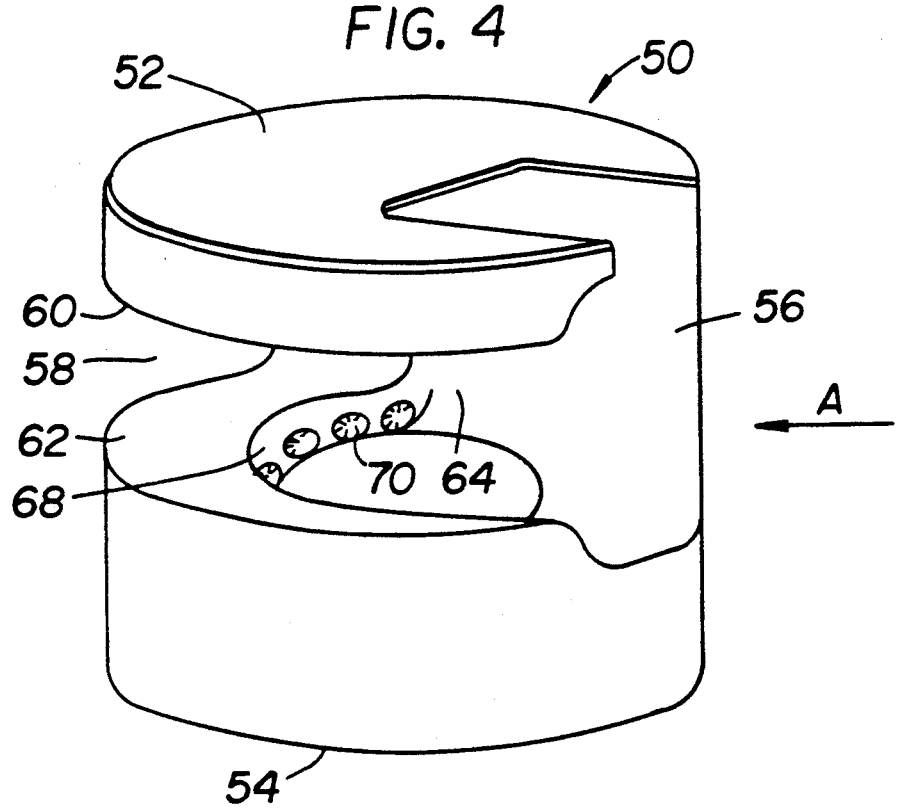
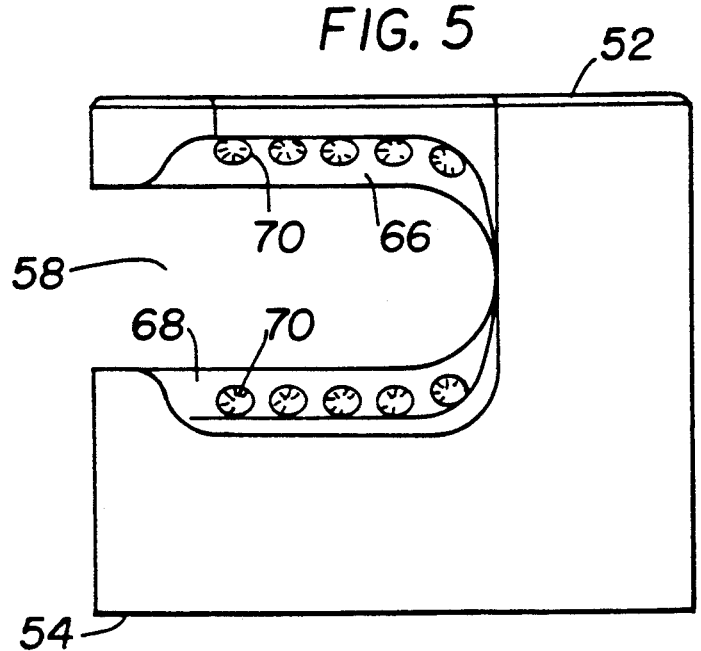

FASTENING DEVICES

FIELD OF THE INVENTION

This invention relates to fastening devices for use in securing two furniture panels together, and more particularly to two-part fastening devices comprising a pin for engagement with a rotatable locking drum.

BACKGROUND OF THE INVENTION

Fastening devices of this general type are well-known. They typically comprise a pin which is inserted into a surface of a first panel to a predetermined depth so that its head protrudes from the panel, and a rotatable locking drum positioned in a recess in a second panel and arranged to receive the head of the pin. The panels are fastened together by rotating the locking drum which, by means of internal camming surfaces, pulls the head of the pin inwardly thus drawing the two panels together.

These known devices have disadvantages in that vibration, for example during transport, can cause the rotating drum to rotate out of the locking position, loosening the joint between the panels.

Prior art devices such as these also have the disadvantage that the rotating drum must be fully turned to achieve the "locked" position. This requires accurate positioning of the recess which is to receive the drum in the respective panel. If this recess is positioned too close to the panel edge the panels will butt up against one another before the drum has been turned to the fully locked position and therefore the joint will readily come loose. Alternatively, with the recess too far from the edge of the panel the locked position will be reached before the panels make contact, so that a gap is left between them. The tolerances for positioning the recess are very low; as little as 0.5 mm deviation from the correct position can cause the problems outlined above.

A device intended to overcome these disadvantages is disclosed in U.S. Pat. No. 4,810,127 to Hettich. This fastening device is provided with axially aligned ribs or saw-tooth shaped raised portions on the circumferential surface of the rotating drum, and also has similar raised portions on the inner camming surface of the drum. These formations ensure that unintentional loosening of the fastening device from the locked position is made substantially more difficult, and also provide some facility for locking in positions other than the fully turned position.

The Hettich camming drum does however have some disadvantages, in particular associated with the saw-teeth portions on its outer surface. When the drum is turned more than once or twice in each direction the saw-teeth start to wear away the inner surfaces of the recess in which the drum is placed, and can tend to make the hole oval. The saw-teeth also increases the torque which is required to turn the drum, making it more difficult to turn. The result can be that the drum fells as if it is locked before the joint is secure.

Other problems can arise because of the forces exerted during turning of the rotatable drum. The underside of the head of the pin member and the inner camming surfaces of the drum have been angled, relative to the pin axis, in prior art devices resulting in outwardly directed forces exerted by the pin head on the cam, which can cause bursting of the rotatable drum.

The invention aims to overcome, at least in part, some of the disadvantages of the prior art just described.

SUMMARY OF THE DISCLOSURE

According to the invention there is provided a fastening device for joining two panels together comprising an elongate pin member adapted to be secured in a first one of said panels, the pin member including a head portion arranged to protrude from said first panel; and a rotatable drum member adapted for insertion in a recess in a major surface of the other panel and arranged to receive said head portion of the pin member, the drum member being provided with at least one camming surface arranged to pull the head of the pin member inwardly into the drum member when said drum member is rotated and thereby fasten the panels, wherein the head of the pin member is provided with irregularities arranged to cooperate with the drum member to facilitate locking engagement of the fastening device.

BRIEF DESCRIPTION OF THE DRAWINGS

In order that the invention may be better understood an embodiment thereof will be described, by way of example, with reference to the accompanying drawings, wherein:

FIG. 4 is a perspective view of a rotatable drum member of a fastening device according to the invention.

FIG. 5 is a side view of the rotatable drum member of FIG. 4 seen from the direction A.

Figure 1:
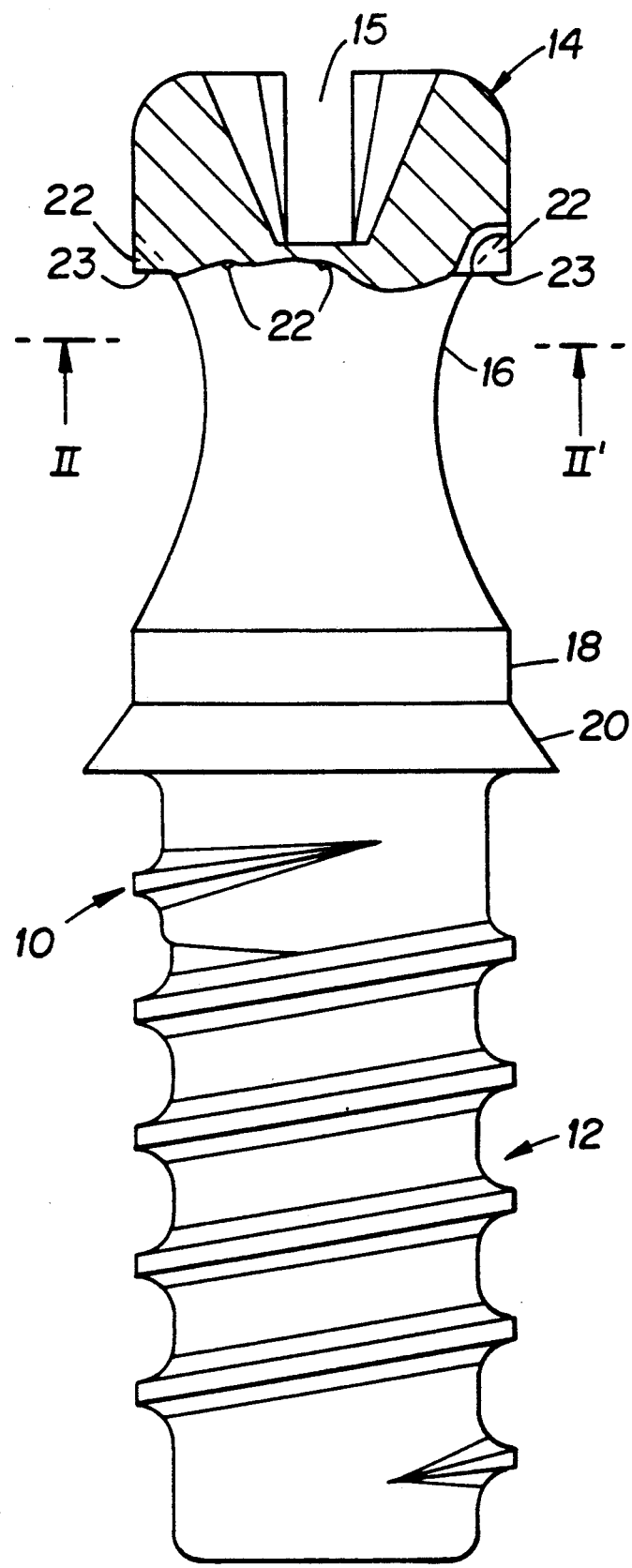
FIG. 1 is a side view of a pin member of a fastening device according to the invention, the head of the pin being shown partly in section.

The pin 10 shown in FIG. 1 is generally of known configuration having a lower portion comprising a threaded shank 12 and an upper portion comprising a head 14 and smoothly contoured neck 16 and shoulder 18 portions. The upper and lower portions of the pin 10 are separated by a flared skirt 20 which acts to prevent the pin 10 from being driven beyond a predetermined depth when it is driven into the edge of a first panel to be joined. The head 14 includes a screwdriver recess 15 in its top surface to enable the pin 10 to be driven into the first panel by a screwdriver.

The pin 10 may be manufactured in a die-casting process using an alloy which comprises mainly zinc, with added copper, aluminium and tin. Such an alloy is available commercially and is known by the trade name "Mazak" or "Zamag". Moulding the pin in this way, rather than using the more usual steel turned pin, enables the inclusion of certain features in the design which could not otherwise be readily incorporated. For instance the contoured neck 16 and flared skirt 20 already described are more difficult to achieve by turning and would increase the cost of making such a pin by turning considerably. The pin 10 includes other features which are achievable because of the use of a moulding process in the manufacture of the pin, to be described below.

As known from the prior art, the protruding upper portion of the pin 10 is arranged to pass into a bore in the edge of the second panel to be joined so that the head 14 is received in a rotatable drum member positioned in a recess in a major surface of that panel. The drum is then rotated to secure the joint, as will be described in more detail below.

As can be seen in FIG. 1, the underside of the pin 10, where it adjoins the neck portion 16, is formed with a number of conical protrusions 22 circumferentially spaced around the periphery of the pin head 14. In the illustrated embodiment the angular separation of the conical protrusions around the circumference of the head 14 is 30°. This can best be seen in the view of the underside of the head, FIG. 2. Each of the conical protrusions 22 is in the form of a circular cone with an internal 90° angle at its apex and the axis of the cone positioned at 45° to the pin axis. This arrangement can be seen in FIG. 3.

The effect of the described arrangement of cones 22 is to provide a number of surfaces 23 on the underside of the head 14 which are in a plane substantially perpendicular to the axis of the pin 10, and to provide a number of positions around the circumference of the underside of the head which are substantially right-angled corners. These interact with the rotatable drum 50 to provide a ratchet-type engagement in a manner to be described later.

Figure 2:
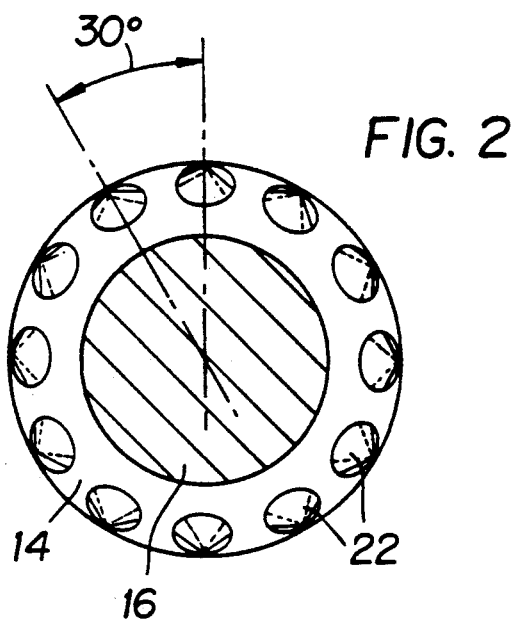
FIG. 2 is a sectional view taken along the line II—II' in FIG. 1.
Figure 3:
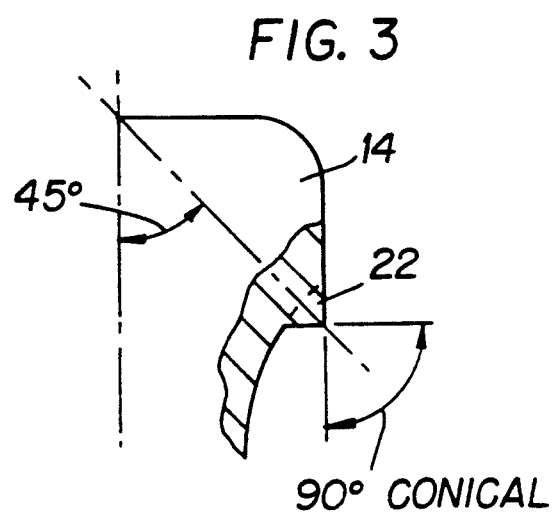
FIG. 3 is a partial view of the pin member of FIG. 1 shown partly in section.

In the arrangement of conical protrusions 22 shown in FIGS. 2 and 3, each of the cones is directed radially outwards with respect to the axis of the pin 10. This is the desired arrangement, but due to the practical considerations of the manufacturing process it may not be achievable in exactly the form shown. When the pin is formed by die-casting two principal mould parts will generally be used, which separate along a plane including the pin axis. The finished pin is extracted from the mould by drawing the two mould parts away from each other in a direction generally perpendicular to the plane of separation. The "parting line" is shown as a vertical line in FIG. 2, and represents the position of the plane of separation. For separation of the mould parts to be possible each of the conical protrusions on either side of the parting line at the top and bottom of FIG. 2 will be formed with a "tail" tapering back towards the parting line along the direction of separation of the mould parts. This is necessary to prevent the formation of undercuts which would make withdrawal of the mould parts impossible. Similar considerations give rise to the surfaces 23 of each of the conical protrusions 22 being formed at 180° to the underside of the head 14.

The provision of the surfaces 23 perpendicular to the pin axis means that the forces exerted during the camming action of the rotatable drum by the underside of the head 14 are no longer directed outwardly in respect of the drum. The tendency for the drum to burst during camming is therefore greatly reduced.

It may be supposed that these results could readily be achieved by making the whole of the underside of the head 14, where it protrudes beyond the diameter of the neck portion 16, a flat surface so that the underside and the sides of the head 14 meet at right angles all around the circumference of the head 14. However, because of the brittle nature of the preferred alloy "Mazak" such an arrangement would be highly susceptible to breaking forces. The use of the cone arrangement avoids this problem whilst still providing means for the engagement with the rotatable drum 50 which is to be described.

However it is not intended that the invention be limited to the specific arrangement described above, nor to the protrusions 22 being conical, and it will be appreciated that any other suitable form of protrusion may be adopted, as will be understood from the following description.

Figure 6:
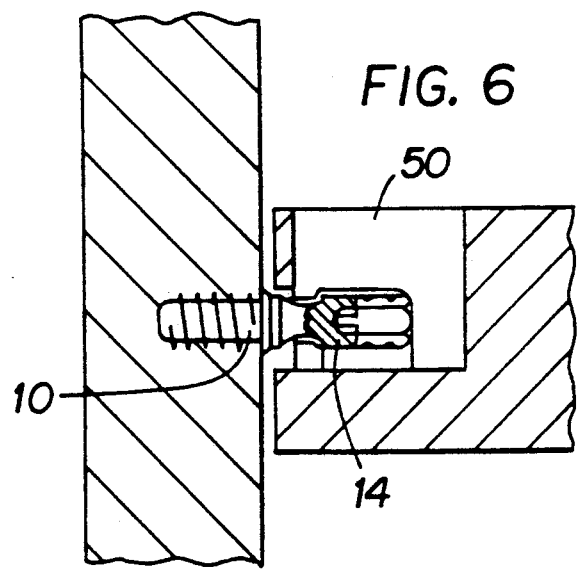
FIG. 6 is a schematic view of a fastening device according to the invention when in use for joining two panels together substantially at right angles to one another.

The rotating drum member 50 of a fastening device according to the invention will now be described with reference to FIGS. 4 to 6 of the accompanying drawings. As with prior art devices of this type, the generally cylindrical rotating drum is intended to be positioned in a recess close to an edge of a major surface of one of two panels to be joined. In the figures the upper surface 52 of the drum member 50 is placed into the recess first, and the depth of the recess is sufficient to allow the lower surface 54 to lie substantially flush with the surface of the panel, as can be seen in FIG. 6.

However, the drum member 50 may alternatively be positioned in the recess so that the upper surface 52 lies flush with the surface of the panel in which it is positioned. The cut-out portion of the upper surface 52 which can be seen in FIG. 4 provides access for the head of the pin 10 from that surface of the panel. The fastening device can therefore be used in situations where a panel containing several drum members is to be fixed between two fixed upright panels, for instance when fitting a shelf. In such cases the pin 10 for each drum member 50 is positioned in the relative upright panel and the shelf incorporating the drum members 50 can be lowered into the pins 10 in situ.

A bore is provided to connect the recess with the edge of the panel so that, when the drum 50 is in position in the recess, the head 14 of the pin 10 described above can pass into the drum 50 through a mouth portion 56. The lower surface 54 of the drum member 50 is provided with a screwdriver recess (not shown) to enable the drum 50 to be turned once the screw head 14 is received inside it. The mouth 56 narrows to form a slot 58 which cuts through the wall of the cylindrical drum 50 and continues laterally around approximately half of the circumference of the drum 50.

The width of the upper and lower surfaces 60, 62, gradually increases from almost nothing along the slot 58 moving away from the mouth portion 56 as can be seen in FIG. 4, and camming surfaces 66 and 68 which are of similar form and are located above and below the slot (see FIGS. 4 and 5) follow the line of the inner edge of surfaces 60, 62.

When the drum 50 is rotated the ends of the camming surfaces 66, 68 adjacent the mouth portion 56 move between the underside of the head 14 and the panel in which the pin 10 is fixed. The head 14 of the pin 10 is retained in the central well 64 of the drum 50 and the neck portion 16 passes through the slot 58 between the upper and lower surfaces 60, 62. As the drum 50 is turned further, the underside of the head 14 bears upon the camming surfaces 66, 68 and, since the pin 10 is fixed in its panel, the camming surfaces 66, 68 pull the head 14 of the pin 10 inwardly towards the center of the drum 50 drawing the two panels together in known fashion.

The surfaces 60, 62 forming the upper and lower boundaries of the slot 58 may be shaped to cooperate with the curved shape of the neck portion 16 of the pin 10.

As can be seen in FIGS. 4 and 5 the camming surfaces 66, 68 are provided with a number of circumferentially spaced dimples 70 which are complementary in shape to the protrusions 22 on the underside of the head 14 of the pin 10, and are arranged to engage with them when the drum 50 is rotated.

As the drum 50 is rotated a first diametrically opposed pair of conical protrusions 22 on the head 14 will engage with a corresponding pair of dimples 70 on opposite sides of the slot 58. This engagement provides a degree of lockability, and as the drum 50 is turned further successive pairs of dimples 70 will engage with the same pair of cones 22 on the head 14 in a ratchet-type movement at the same time as the camming surfaces 66, 68 act to pull the pin 10 inwardly, thereby providing sequential locking of the fastening device.

Rotation of the drum 50 can continue until the neck 16 of the pin 10 reaches the closed end of the slot 58 furthest from the mouth portion 56 or, alternatively, when the two panels being joined come into contact with one another. When this occurs the pin 10 and drum 50 will be in a locked position because of the engagement of a pair of dimples 70 and cones 22.

The precision required for positioning the recess in the panel which is to receive the drum 50 is less than that required for prior art devices, because the drum does not have just a single, fully-turned, locked position. The fastening device of the invention therefore also makes it easier to avoid a gap between the two panels when the joint is tightened, since there is a reduced disadvantage in positioning the drum recess closer to the edge of the panel than the distance needed to allow the drum 50 to be turned far enough for the pin 10 to reach the end of the slot 58. In the prior art, this would have meant that the drum 50 could not lock because it had not fully turned, but in the device of the invention a locked position can still be achieved even without complete turning of the drum 50.

Figure 7:
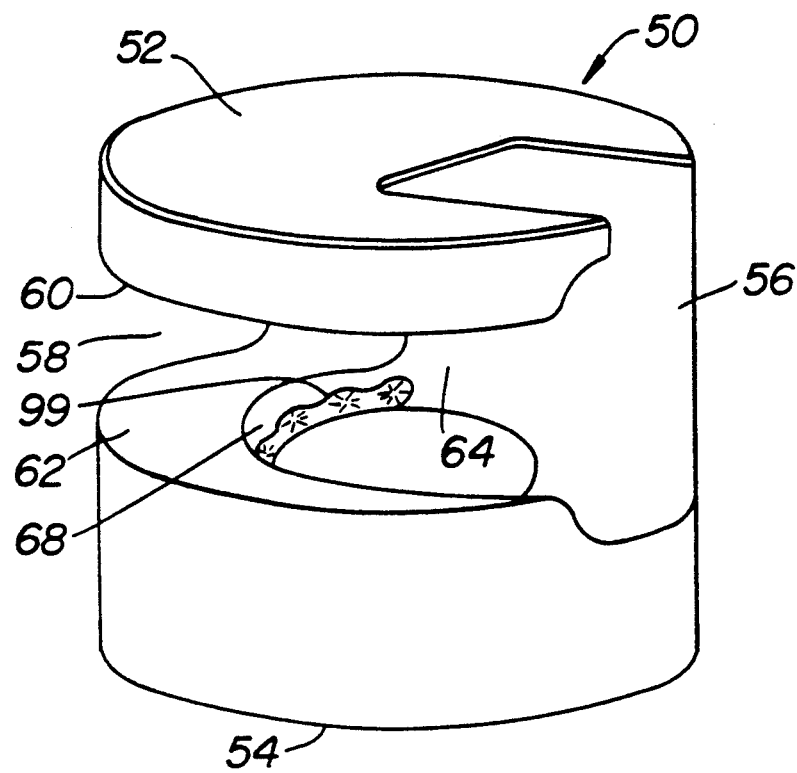
FIG. 7 is a detailed description of the preferred embodiments.

Sequential locking during rotation of the drum 50 could also be achieved with a single set of dimples 70 either above or below the slot 58. Because this would result in only one side of the head 14 of the pin 10 being subjected to a turning force, rotating the drum 50 tends to twist the pin 10. If the direction of the thread on the lower part of the pin 10 and the side of the slot 58 on which dimples 70 are to be provided are appropriately choosen, the twisting force acting on the head 14 of the pin 10 when the drum 50 rotates may be such as to act to tighten the threaded shank 12 of the pin 10 further into the edge of the panel into which it is driven, The depressions in the camming surfaces 66, 68 have been described as discrete dimples. However, the depressions may taken any suitable form and it is envisaged that they may be so shaped and positioned that they merge, forming essentially a single wave-shaped groove 99 which has variable width and depth to engage the protrusions on the head of the pin See FIG. 7.

It is envisaged that the drum 50 described above as having depressions in one or both of the camming surfaces 66, 68 will be moulded in a die-casting process, preferably in "Mazak". However, it is possible that the pin 10 described as having protrusions formed around the underside of its head 14 may be used in conjunction with a plastic drum. In this case the drum need not be provided with depressions in the camming surfaces, locking engagement being achieved by the protrusions on the pin biting into the plastic material of the camming surfaces.

As will be apparent various other modifications are possible within the ambit of the invention. For example, although described solely in relation to fastening two panels together substantially at right angles to one another, it will be appreciated that an adaptation of the above described embodiment could be used to join panels in other orientations, for instance in edge-to-edge relationship. Also the pin member may be double-ended, having a head at each end for cooperation with a respective rotatable drum. In addition, it is possible that the cones or protrusions are formed in the drum member and the dimples on the head of the pin. All such modifications are deemed to be within the broad scope of the claimed invention.

I claim:

1. A fastening device for joining two panels together comprising:
   an elongate pin member adapted to be secured in a first one of said panels, the pin member including a head portion arranged to protrude from said first panel; and
   a rotatable drum member adapted for insertion in a recess in a major surface of the other panel and arranged to receive said head portion of the pin member, the drum member being provided with at least one camming surface arranged to pull the head of the pin member inwardly into the drum member when said drum member is rotated and thereby fasten the panels,
   wherein the head of the pin member is provided with protrusions or depressions arranged to engage respective depressions or protrusions provided in a cooperatively disposed surface of the drum member to facilitate locking engagement of the fastening device.

2. A fastening device according to claim 1, wherein: said locking engagement is provided in a plurality of rotational positions of the drum member.

3. A fastening device according to claim 1, wherein: the protrusions or depressions on the head of the pin member are provided on the underside of the head.

4. A fastening device according to claim 1, wherein: the protrusions or depressions on the head of wherein:
   the protrusions or depressions on the head of the pin member are arranged to provide a plurality of surface portions on the underside of the head in a plane substantially perpendicular to the axis of the pin member.

5. A fastening device according to claim 1, wherein: the protrusions on the head of the pin member comprise a plurality of circumferentially spaced conical protrusions.

6. A fastening device according to claim 5, wherein: the angular spacing between each adjacent pair of protrusions on the pin member is substantially 30°.

7. A fastening device according to claim 1, wherein: said at least one camming surface is provided with depressions or protrusions.

8. A fastening device according to claim 1, wherein: the depressions or protrusions in the drum member are arranged to provide a plurality of surface portions in a plane substantially perpendicular to the axis of the pin member when the pin member is in its operative position.

9. A fastening device according to claim 1, wherein:

the depressions on the drum member comprise a plurality of circumferentially spaced conical depressions.

10. A fastening device according to claim 1, wherein: the depressions on the drum member comprise a series of linked depressions forming a wave-shaped groove.

11. A fastening device according to claim 1, wherein: the protrusions in the drum member comprise a plurality of circumferentially spaced conical protrusions.

12. A fastening device according to claim 1, wherein: the drum member is provided with two camming surfaces each provided with said depressions or protrusions.

* * * * *